United States Patent

Erdmann

[15] 3,677,006
[45] July 18, 1972

[54] BOOSTER FOR HYDRAULIC SYSTEMS

[72] Inventor: Hans Erdmann, Neu-Isenburg, Germany
[73] Assignee: ITT Industries, Inc., New York, N.Y.
[22] Filed: July 21, 1970
[21] Appl. No.: 56,829

[30] Foreign Application Priority Data

July 23, 1969    Germany.................P 19 37 317.2

[52] U.S. Cl. ..............................60/54.6 P, 60/52 B
[51] Int. Cl. ..........................................F15b 7/00
[58] Field of Search................................60/54.6 P

[56] References Cited

UNITED STATES PATENTS

| | | | |
|---|---|---|---|
| 2,442,057 | 5/1948 | Page | 60/54.6 R |
| 2,908,137 | 10/1959 | Spalding et al. | 60/54.6 P |
| 2,410,269 | 10/1946 | Chouings | 60/54.6 P |
| 3,526,089 | 9/1970 | Fulmer | 60/52 B |

Primary Examiner—Martin P. Schwadron
Assistant Examiner—A. M. Zupcic
Attorney—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

[57] ABSTRACT

This booster for hydraulic brake systems has a control valve arranged within the brake actuating member to control the booster flow. The flow passes through the interior of the actuating member and as the actuator slide moves forward, the valve closes a connection between the reservoir and the working chamber before opening the connection between the booster and the working chamber.

14 Claims, 3 Drawing Figures

Inventor
HANS ERDMANN

BOOSTER FOR HYDRAULIC SYSTEMS

The invention relates to a booster for hydraulic systems. This booster assists the force exerted to operate particularly a two-circuit brake system by means of an accumulated auxiliary pressure. For this purpose upon actuation the supply of pressure medium is connected from the pressure medium source to the effective surface of the working piston by opening a valve.

Boosters of the above-mentioned type are already known, e.g., upon actuation of the system atmospheric air is supplied to one of two vacuum chambers by a valve which is opened by the actuating appliance. This air acts in direction of actuation upon the displaceable partition between the two chambers.

In a second type of boosters upon actuation of the mechanic force-transmitting means a hydraulic pressure is added to the mechanical force. This pressure assists the initiated braking process.

The German Pat. Specification No. 1,226,444 suggests an arrangement for a pump-driven hydraulic system of constant circulation. In a master cylinder consisting of a control unit and a power cylinder unit a hollow actuating piston is displaced in the control unit by the force applied from outside. The front face of said piston overcomes a certain clearance and is stopped by the surface functioning as a valve seat, said surface being formed by a sleeve embeded in the working piston. In this way the flow of the pressure medium from the pump through the master cylinder to the supply tank is interrupted and the pressure medium, conveyed by the pump, acts upon the annular surface of the actuating piston and the effective surface of the working piston. A pin rigidly connected with the working piston projects with clearance into the hollow space of the actuating piston and when displaced actuates a lever arranged in a lateral recess. The lever in turn acts upon a tilting bar which bears a tappet. The tappet —after having overcome a certain clearance —opens a check valve in the line to the accumulator. Since this high pressure line is connected to the pressure medium supply via a longitudinal bore in the housing of the control unit the working piston and the actuating piston are additionally subjected to the pressure from the accumulator after the check valve has opened. Therefrom results reaction force which the driver feels through the pedal.

The German Pat. Specification No. 1,134,904 suggests a brake booster in the cylinder of which an actuating piston is arranged to slide and to cooperate with a sleeve which has lateral bores so that depending on the position of the actuating piston the pressure medium circulation from the pump through the housing chamber to the supply tank is cleared or interrupted. The stem of a valve body projects into a central bore in the actuating piston. Upon actuation of the system said stem comes to lie against the rear surface of the working piston and closes the bore of the working piston. The pressure which is built up due to the interruption of the pressure medium circulation acts upon the effective surface of the working piston in the direction of actuation and upon the reduced annular surface of the actuating piston and produces a reaction force which gives the driver a feeling for the exerted pedal effort. When the force applied to the pedal is reduced a return spring puts the working piston back into its initial position and the pressure is balanced through the bore of the working piston.

These types of brake boosters which consist of a control unit and a working unit are spacy and require numerous seals which enclose moving parts thereby reducing the sensivity of reaction.

Another disadvantage of the systems with a pump-driven hydraulic circuit of constant circulation is that the capacity of the pump, for instance, in case of a panic braking is not sufficient to convey the necessary pressure medium for the booster. Due to the high external force exerted on the brake pedal the working cylinder is mechanically displaced by the actuating cylinder. This results in reduced pressure and the working piston. The consequence is a metallic contact between the piston surfaces and the oil begins to foam. For these reasons a pump has to be provided whose capacity will be sufficiently high for exceptional occasions.

An object of the invention is to avoid the above-mentioned disadvantages and to provide a reliably operating brake booster of a compact construction with a reduced number of seals contacting moving parts. Further the booster should operate with a pump of low capacity.

According to the invention this is achieved by arranging the valve which controls the supply of pressure medium from the servo pressure medium source, in the control slide, i.e. in the actuating piston. Through this control slide a connection is provided between the pressure source and the chamber in front of the control slide. Further the above-mentioned valve cooperates with a pressure balancing valve which controls the pressure medium passage from the chamber in front of the control slide via the working piston to the reservoir so that the valve which controls the supply from the supply tank opens when the pressure balancing valve closes and vice versa.

In a special embodiment the working piston is made of one piece together with the master cylinder piston. The chamber in front of the control slide is directly connected with one circuit of the hydraulic system, e.g., with one brake circuit.

In a special embodiment of the invention the valve body which controls the pressure medium passage from the chamber in front of the control valve through the working piston to the reservoir and the valve body which in its rest position closes the space in the control slide subjected to accumulator pressure, are connected by a line projecting through the bore in the front face of the control slide to the interior thereof so that the movements of the valve bodies become interdependent.

In a different embodiment of the invention the control slide provides a cylindric bore, open in the working direction, whose connection to the cross bore which is under accumulated pressure is controlled by the valve body. Said valve body is tightly enclosed by a rubber member which is arranged in the cylindric bore in a sealing manner and comes to lie in the working direction against a stop in the valve body. On this rubber member rests a pot-shaped piston which closes the bore and bears the pressure of the balancing valve.

The master cylinder, the servo-unit and the pressure medium source, e.g., an accumulator, are preferably combined into one constructional unit. The pressure medium source, e.g., an accumulator joined with the master cylinder by casting or screwed being to an extension of the master cylinder.

The invention can be embodied in various ways and will be described more precisely with reference to the accompanying drawings.

Figure 1:
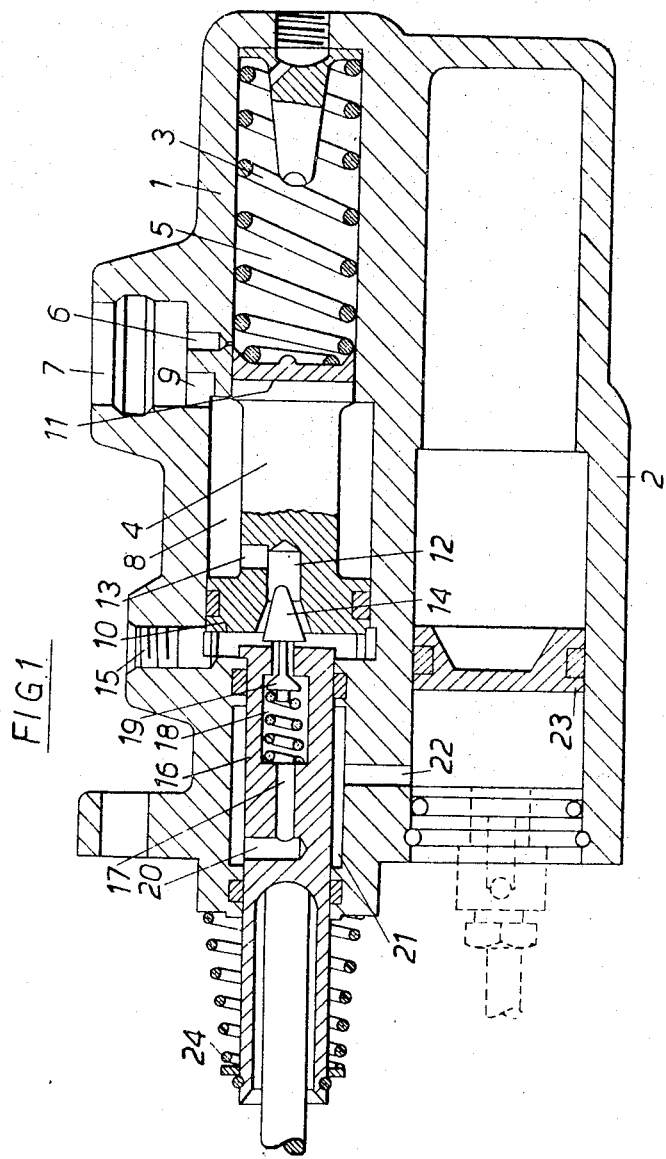
FIG. 1 shows a longitudinal cross section through the brake booster according to the invention with an accumulator cast on the housing.

According to FIG. 1 the cylinder housing 1 of the brake booster and the housing 2 of the accumulator are cast in one piece. A spring 3 is supported on the bottom of the cylinder housing 1 in which the connection for the brake line to the wheel brake cylinders of one axle is provided, and keeps the working piston 4 which is sealed against the cylinder wall by a sealing cup, in initial position. A breathing hole 6 in the housing wall leads from the working chamber 5 between the working piston 4 and the cylinder bottom to the connection 7 of the reservoir. By a recess in the piston circumference an annular chamber is formed between the working piston 4 and the cylinder wall, the so-called suction chamber 8. This chamber communicates also with the reservoir through a bore 9 in the housing. The interior of the cylinder is slightly widened at this point so that the effective surface 10 of the working piston 4 is larger than its front face 11 which results in a certain pressure transmission. From the effective surface 10 a blind hole 12 is worked into the working piston 4. The blind hole communicates through a cross bore 13 with the suction chamber 8. The bore 12 has a conical mouth or valve seat so that it cooperates with the tapered head 14 of a double valve body. The working piston 4 rests with supporting ribs arranged along the circumference of the effective surface on a shoulder in the cylinder housing. From the space which is formed in this way a connection 15 branches off to the wheel brake cylinders of the second axle. In the adjoining narrower portion of the cylinder housing 1 the control slide 16 is guided in a sealing manner. A longitudinal bore 17 in the control slide opens to a small hollow space 18 which is separated from the above-described brake system in the direction of motion by the cone 19 of the valve body. The link between the two valve members 14, 19 passes with clearance through the opening in the control slide. A spring arranged in the hollow space 18 keeps the valve body in initial position, i.e. the valve 19 is closed. A cross bore 20 connects the bore 17 with the annular chamber 21 formed by a recess in the cylinder housing. Said annular chamber communicates constantly with the accumulator via the bore 22. The pressure medium is conveyed by a pump from the reservoir via a check valve to the accumulator. In the example embodiment of FIG. 1 the accumulator which is cast in one piece with the brake booster is divided into two chambers by a displaceable partition 23 which is sealed on the sides. One of said chambers is filled with pressurized gas, the other chamber receives the pressure medium.

Figure 3:
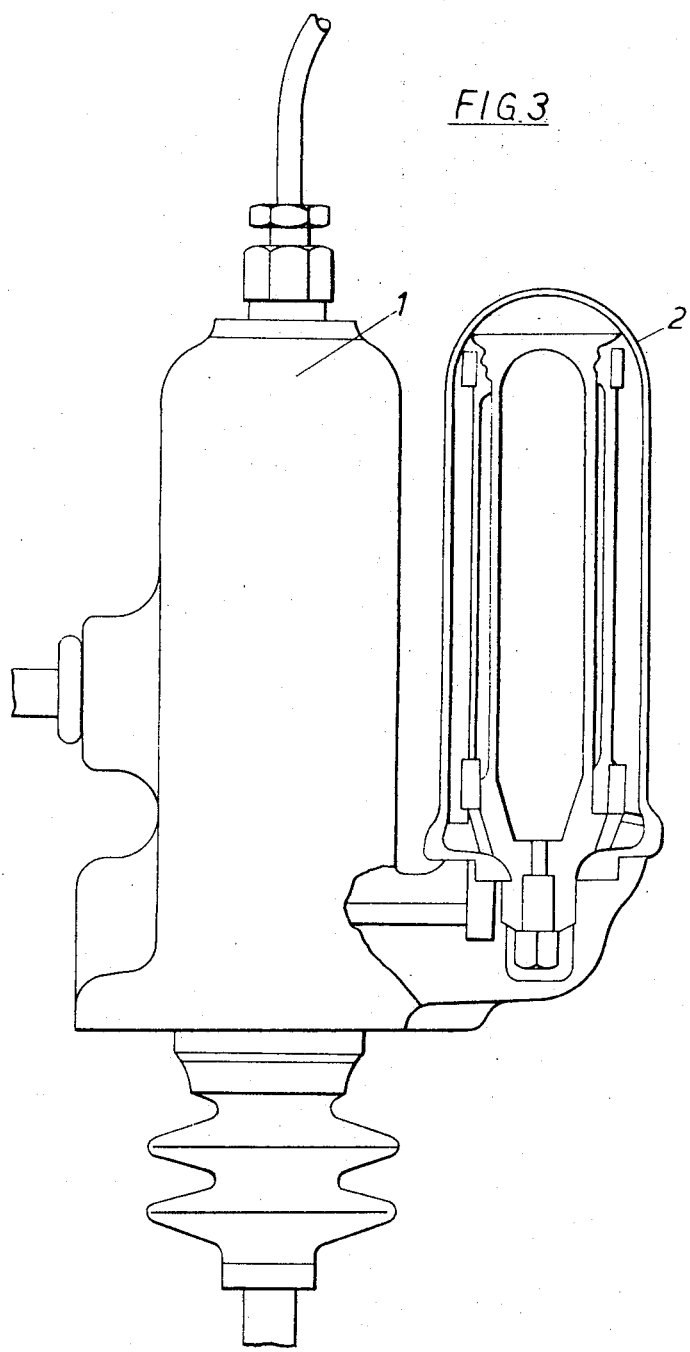
FIG. 3 shows a brake booster with the accumulator screwed to the booster.

In the example embodiment of FIG. 3 the accumulator is screwed to an extension of the booster housing.

The system operates as follows:

In initial position the valve 19 is closed and separates the hydraulically interconnected chambers 21, 18 of the control unit which are under the pressure of the accumulator, from the working unit of the booster. The booster consists of the two brake circuits and the working cylinder. The valve 14 is opened so that the pressure medium is in all chambers of the working unit pressureless. When the control slide 16 is moved from outside the valve body 14, 19 joins the movement under the influence of the accumulated pressure in the chamber 18 till the valve cone 14 comes to lie against the conical inner surfaces of the bore 12. In this way the brake circuit with the connection 15 is hydraulically separated from the reservoir. When the valve 14 is closed the valve cone 19 is lifted from the stop in chamber 18 of the control slide and clears the passage for the pressure medium from the accumulator and the annular chamber 21 respectively via the bore 20, 17 to the brake line of the wheel cylinders of one axle (connection 15). Besides the pressure medium acts upon the effective surface 10 of the working piston 4. When the sealingcup on front face 11 of piston 4 has passed the breathing hole 6 the pressure medium in the working chamber 5 is compressed by the movement of the working piston 4 so that also the brake pads on the wheel of the second axle are brought into engagement.

When the effort which has been applied to the brake pedal is reduced the control slide 16 is returned into its initial position by the spring 24, the valve 19 is closed and thus the working unit separated from the accumulator. The valve 14 is opened so that the pressure medium can flow from the brake circuit at connection 15 through the bores 12 and 13 and the suction chamber 8 of the master cylinder to the reservoir. The working piston 4 is returned into its initial position by the spring 3 and the necessary pressure balance in the second brake circuit is ensured by the breathing hole 6.

Figure 2:
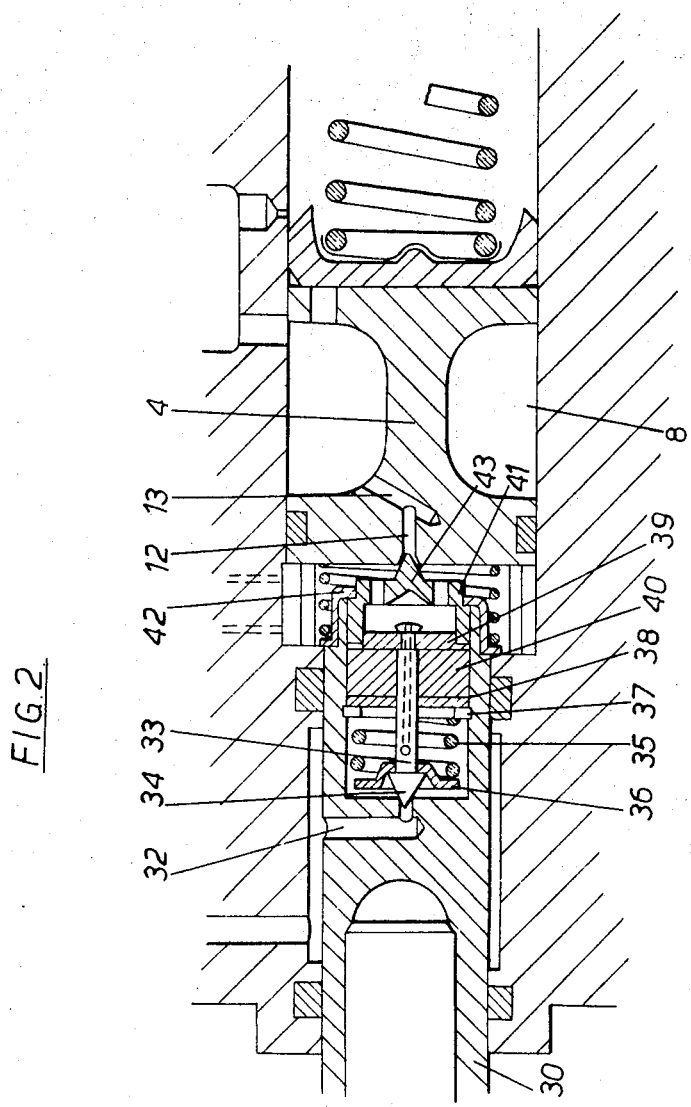
FIG. 2 shows a longitudinal cross section through another example embodiment of the invention.

FIG. 2 shows a variation of the valve which controls the supply from the accumulator for the same system as above. The valve is again arranged in the control slide. The control slide 30 provides an open cylindrical bore 34 on the side facing the working piston. This bore communicates with a cross bore 32 in the control slide 30 via another bore. The cross bore 32 leads to an annular chamber as in the first example embodiment. The annular chamber is connected to the accumulator. In rest position the valve body 33 closes the passage from the cross bore 32 to the bore 34.

The valve body is kept in engagement with the valve seat by a spiral spring 35 which is supported between a stop 37 in the bore 34 and a spring plate 36 embracing the valve body behind the cone. In the example embodiment of FIG. 2 the stop 37 consists of a ring which is embedded in a groove approximately halfway between the ends of the cylindrical bore 34. On one side of the stop 37 a supporting plate 38 is arranged. Between this plate 38 and a reaction plate 39 a rubber plate 40 is sandwiched which tightly encloses the valve body 33. The reaction plate 39 has a smaller diameter than the hollow space of the control slide 30 so that a pot-shaped piston 41 which closes the hollow space rests on the edge of the rubber plate 40. On the front face of the pot-shaped piston 41 which is prevented by a jacket 42 from slipping out of the control slide 30 a cone 43 is placed which cooperates in the working piston with the bore leading to the suction chamber 8 and hence functions as pressure balancing valve. Bores in the valve closing member 33 and on the front face of the pot-shaped piston allow the pressure medium to pass from the accumulator to the effective surface of the working piston 4 when the valve 33 is opened.

Upon actuation of the system the rubber plate 40 sandwiched between two plates and embracing the valve body 33 changes the transmission between the actuating force and the valve lifting force and causes a reversion of the direction of motion. When the control slide is moved the valve 43 at first closes the path to the reservoir, then the pot-shaped piston 41 compresses the rubber plate 40 at the edge in longitudinal direction so that it yields in the center in direction of the control slide movement and takes the valve closing member 33 along. Thus —according to the invention —the rubber hydrostatics adds the pressure from the accumulator to the mechanical force by little pedal effort. In this way the actuation of the brake piston in the brake circuit is initiated as described above. In case that the accumulator, the pump or the connection to the accumulator become inoperative a braking in one brake circuit is still possible by building up pressure by mere mechanic displacement of the working piston. The front face of the control slide then comes to lie against the effective surface of the working piston by an increase mechanic force and due to the displacement of the working piston operates the brakes of the wheel of one axle, preferably of the rear axle.

A special advantage of the invention is the compact construction by arranging the valve of the accumulator in the control slide, by combining the master cylinder, the servo unit and the accumulator into one unit and by providing the return connection to the reservoir through the suction chamber of the working piston.

The system can be operated with only little effort from outside and needs only three seals which contact moving parts. Further the system can operate with a pump of low capacity because the pump is required only for feeding the accumulator.

I claim:

1. A booster for a hydraulic brake system having two brake circuits comprising:
    a longitudinal hollow cylindrical housing having a closed end and an opened end;
    a working piston disposed within and coaxial of the longitudinal axis of said housing, said piston having one end thereof spaced from said closed end to form a first chamber between said one end and said closed end, a transverse surface on the other end thereof, a blind hole disposed coaxial of the longitudinal axis of said housing, said blind hole being open at said surface and closed at a given point within said piston spaced from said surface, said blind hole containing a first valve seat adjacent said surface;
    a first outlet to one of said two brake circuits disposed in said closed end and in communication with said first chamber;

a second chamber formed between the interior surface of said housing and the exterior surface of said piston in communication with said blind hole;

a second outlet to a pressure medium reservoir permanently in communication with said second chamber and in communication with said first chamber when said piston is in its unactuated position;

a control slide disposed within and coaxial of the longitudinal axis of said housing, said control slide having one end thereof extending through said opened end of said housing and the other end thereof spaced from said surface to form a third chamber between said surface, said other end of said control slide and the interior surface of said housing, said control slide having a longitudinal bore therein disposed coaxial of said longitudinal axis of said housing, one end of said longitudinal bore including a second valve seat;

a third outlet to the other of said brake circuits extending radially through the wall of said housing in communication with said third chamber;

a fourth chamber formed between the interior surface of said housing and the exterior surface of said slide;

a first transverse bore disposed in said control slide providing communication between said fourth chamber and said longitudinal bore;

an accumulator providing a hydraulic medium under pressure;

a second transverse bore disposed in said housing providing communication between said fourth chamber and said accumulator;

a first valve member disposed in a valve closed and a valve opened relation with said first valve seat, said first valve member and said first valve seat cooperating in the unactuated position of said control slide to be in said valve opened relation to connect said reservoir to both of said two brake circuits;

a second valve member disposed in a valve closed and a valve opened relation with said second valve seat, said second valve member and said first valve seat cooperating in the unactuated position of said control slide to be in said valve closed relation to disconnect said accumulator from said third chamber and said transverse surface;

first means disposed coaxial of the longitudinal axis of said housing to interconnect said first and second valve members;

second means disposed adjacent said opened end of said housing to actuate said control slide to place said first valve member and said first valve seat in said valve closed relation to close the connection between said reservoir and said two brake circuits and to place said second valve member and said second valve seat in said valve opened relation to enable the pressure medium from said accumulator to be applied to said third chamber and said surface to boost the braking force applied to said two brake circuits; and only three seals, the first and second of said seals being disposed between the interior surface of said housing and the exterior surface of said control slide, one of said first and second of said seals being disposed on one side of said fourth chamber and the other of said first and second of said seals being disposed on the other side of said fourth chamber, and the third of said seals being disposed between the interior surface of said housing and the exterior surface of said piston adjacent said surface.

2. A booster according to claim 1, further including
a helical spring disposed between said opened end of said housing and said control slide to return said control slide to its unactuated position when said second means is not operative.

3. A booster according to claim 1, further including
a helical spring disposed in said first chamber to return said piston to its unactuated position when said second means is not operative.

4. A booster according to claim 1, further including
a helical spring disposed in said longitudinal bore associated with said second valve member to return said first and second valve members to their relation with said first and second valve seats during the unactuated position of said control slide when said second means is not operative.

5. A booster according to claim 1, wherein
a brake system master cylinder piston and said piston are formed as a single component of said booster.

6. A booster according to claim 1, wherein
said housing and said accumulator are combined into one structural unit.

7. A booster according to claim 1, wherein
said longitudinal bore is terminated by a transverse member adjacent said third chamber, said transverse member having an aperture disposed therein coaxial of the longitudinal axis of said housing; and said first means includes
a structural link interconnecting said first and second valve members, said structural link passing through said aperture.

8. A booster according to claim 1, wherein
said longitudinal bore is open adjacent said third chamber; and said first means includes
a supporting plate disposed transversely of said longitudinal bore at a predetermined point therealong,
a rubber plate disposed transversely of said longitudinal bore intermediate said predetermined point and said third chamber in contact with said supporting plate,
a reaction plate disposed transversely of said longitudinal bore intermediate said rubber plate and said third chamber in contact with said rubber plate, said reaction plate having a smaller diameter than the diameter of said rubber plate,
a structural link disposed coaxial of the longitudinal axis of said housing, said structural link being connected to said second valve member and extending through said supporting, rubber and reaction plates, said rubber plate gripping said structural link, and
a pot-shaped piston disposed within said longitudinal bore adjacent said third chamber to close said longitudinal bore, the sides of said pot-shaped piston encircling said reaction plate, the ends of said sides of said pot-shaped piston bearing against said rubber plate and the bottom of said pot-shaped piston being connected to said first valve member.

9. A booster according to claim 8, wherein
said first means further includes
a jacket interconnecting said pot-shaped piston and the ends of said longitudinal bore adjacent said third chamber to prevent said pot-shaped piston from slipping out of said longitudinal bore.

10. A booster according to claim 1, further including
a first helical spring disposed between said opened end of said housing and said control slide to return said control slide to its unactuated position when said second means is not operative;

a second helical spring disposed in said first chamber to return said piston to its unactuated position when said second means is not operative;and a third helical spring disposed in said longitudinal bore associated with said second valve member to return said first and second valve members to their relation with said first and second valve seats during the unactuated position of said control slide when said second means is not operative.

11. A booster according to claim 10, wherein
said housing and said accumulator are combined into one structural unit.

12. A booster according to claim 11, wherein
said longitudinal bore is terminated by a transverse member adjacent said third chamber, said transverse member having an aperture disposed therein coaxial of the longitudinal axis of said housing; and said first means includes a structural link interconnecting said first and second valve members, said structural link passing through said aperture.

13. A booster according to claim 11, wherein said longitudinal bore is open adjacent said third chamber; and said first means includes a supporting plate disposed transversely of said longitudinal bore at a predetermined point therealong, a rubber plate disposed transversely of said longitudinal bore intermediate said predetermined point and said third chamber in contact with said supporting plate, a reaction plate disposed transversely of said longitudinal bore intermediate said rubber plate and said third chamber in contact with said rubber plate, said reaction plate having a smaller diameter than the diameter of said rubber plate, a structural link disposed coaxial of the longitudinal axis of said housing, said structural link being connected to said second valve member and extending through said supporting, rubber and reaction plates, said rubber plate gripping said structural link, and a pot-shaped piston disposed within said longitudinal bore adjacent said third chamber to close said longitudinal bore, the sides of said pot-shaped piston encircling said reaction plate, the ends of said sides of said pot-shaped piston bearing against said rubber plate and the bottom of said pot-shaped piston being connected to said first valve member.

14. A booster according to claim 13, wherein said first means further includes a jacket interconnecting said pot-shaped piston and the ends of said longitudinal bore adjacent said third chamber to prevent said pot-shaped piston from slipping out of said longitudinal bore.

* * * * *